(12) United States Patent
Grover (10) Patent No.: US 12,160,632 B2
(45) Date of Patent: *Dec. 3, 2024

(54) PRESERVING CHANNEL LOCK AND PERFORMING DYNAMIC AD INSERTION (DAI) IN A MULTI-DEVICE SETUP (71) Applicant: Roku, Inc., San Jose, CA (US)

(72) Inventor: Matthew Grover, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,321

(22) Filed: Oct. 13, 2023

(65) Prior Publication Data

US 2024/0048800 A1  Feb. 8, 2024

Related U.S. Application Data (63) Continuation of application No. 17/702,239, filed on Mar. 23, 2022, now Pat. No. 11,838,581.

(51) Int. Cl.
| *H04N 21/234* | (2011.01) |
| *H04N 21/44* | (2011.01) |
| *H04N 21/442* | (2011.01) |
| *H04N 21/466* | (2011.01) |
| *H04N 21/81* | (2011.01) |

(52) U.S. Cl.
CPC ..... *H04N 21/44016* (2013.01); *H04N 21/812* (2013.01)

(58) Field of Classification Search
None
See application file for complete search history.

(56) References Cited

U.S. PATENT DOCUMENTS

| 2016/0192032 A1* | 6/2016 | Sinha | G06T 1/0021 |
| | | | 725/12 |
| 2018/0035149 A1* | 2/2018 | Choi | H04N 21/812 |
| 2020/0404348 A1* | 12/2020 | Merchant | H04N 21/44204 |
| 2021/0321160 A1 | 10/2021 | Cormie et al. | |
| 2022/0030324 A1 | 1/2022 | Stavropoulos | |

OTHER PUBLICATIONS

Extended European Search Report directed to European Application No. 23163119.3, mailed May 9, 2023, 10 pages.

* cited by examiner

*Primary Examiner* — Brian T Pendleton
*Assistant Examiner* — Jean D Saint Cyr
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for preserving channel lock while performing dynamic ad insertion (DAI) in a multi-device setup. An example embodiment operates by identifying a secondary device that loses a channel lock on a channel based on a primary device performing DAI on the channel. The embodiment determines that that the primary device is configured to perform a DAI to replace a portion of multimedia content in the channel with a replacement portion of multimedia content. The embodiment modifies an automated content recognition (ACR) behavior for the secondary device based on the determining, thereby preventing the secondary device from losing channel lock on the channel. The embodiment then modifies a DAI behavior for the secondary device in response to the modifying the ACR behavior for the secondary device.

20 Claims, 4 Drawing Sheets

PRESERVING CHANNEL LOCK AND PERFORMING DYNAMIC AD INSERTION (DAI) IN A MULTI-DEVICE SETUP

CROSS-REFERENCE TO RELATED APPLICATIONS

This application is a continuation application of U.S. application Ser. No. 17/702,239, filed Mar. 23, 2022, which is incorporated herein in its entirety.

BACKGROUND

Field

This disclosure is generally directed to preserving channel lock in a multi-device setup, and more particularly to preserving channel lock and performing dynamic ad insertion (DAI) in a multi-device setup.

Background

A user may consume multimedia content in a multi-device setup. For example, the user may watch or listen to multimedia content using an automated content recognition (ACR) enabled media device (e.g., a stick, a set-top box (STB), etc.) and an ACR enabled output device (e.g., a television (TV)). In some cases, the user may watch a linear TV channel using an ACR enabled media device and an ACR enabled TV. In such a scenario, the ACR enabled media device may be tuned to the linear TV channel and the ACR enabled TV may receive the output from the media device (e.g., over a High-Definition Multimedia Interface (HDMI) cable) and display it on its screen. It is also often the case that both the ACR enabled media device and the ACR enabled output device may be configured to perform dynamic ad insertion (DAI). But such multi-device setups often suffer from various technological problems.

First, the ACR enabled output device may lose channel lock when the ACR enabled media device performs a DAI on the channel. This is because the ACR enabled output device is expecting to encounter the original content in the channel (e.g., the original advertisement in the channel) rather than the replacement content inserted into the channel by the ACR enabled media device. Second, the ACR enabled output device may be unable to intelligently perform a DAI on the channel because it will be attempting to replace the same underlying content as the ACR enabled media device. In other words, the ACR enabled output device may be unable to intelligently perform a DAI on the channel because it may be replacing the replacement content inserted into the channel by the ACR enabled media device rather than the original content in the channel (e.g., the original advertisement in the channel). Thus, there is a need to preserve channel lock and intelligently perform DAI in a multi-device setup.

SUMMARY

Provided herein are system, apparatus, article of manufacture, method and/or computer program product embodiments, and/or combinations and sub-combinations thereof, for preserving channel lock and performing dynamic ad insertion (DAI) in a multi-device setup. It is often the case that a user may watch or listen to multimedia content using an automated content recognition (ACR) enabled media device (e.g., a stick, a set-top box (STB), etc.) and an ACR enabled output device (e.g., a television (TV)). For example, the user may watch a linear TV channel using an ACR enabled media device and an ACR enabled TV. In such a scenario, the ACR enabled media device may be tuned to the linear TV channel and the ACR enabled TV may receive the output from the media device (e.g., over a High-Definition Multimedia Interface (HDMI) cable) and display it on its screen. It also often the case that both the ACR enabled media device and the ACR enabled output device may be configured to perform DAI. For example, both the ACR enabled media device and the ACR enabled output device may be configured to perform DAI on the linear TV channel. However, such multi-device setups often suffer various technological problems.

First, the ACR enabled output device may lose channel lock when the ACR enabled media device performs a DAI on the channel. This is because the ACR enabled output device is expecting to encounter the original content in the channel (e.g., the original advertisement in the channel) rather than the replacement content inserted into the channel by the ACR enabled media device. Second, the ACR enabled output device may be unable to intelligently perform a DAI on the channel because it will be attempting to replace the same underlying content as the ACR enabled media device. In other words, the ACR enabled output device may be unable to intelligently perform a DAI on the channel because it may be replacing the replacement content inserted into the channel by the ACR enabled media device rather than the original content in the channel (e.g., the original advertisement in the channel).

In contrast to existing approaches, embodiments described herein solve these technological problems by modifying an ACR behavior and a DAI behavior for a secondary device in a multi-device setup. An example embodiment operates identifying a secondary device that loses a channel lock on a channel based on a primary device performing DAI on the channel. The embodiment determines that that the primary device is configured to perform a DAI to replace a portion of multimedia content in the channel with a replacement portion of multimedia content. The embodiment modifies an ACR behavior for the secondary device based on the determining, thereby preventing the secondary device from losing channel lock on the channel. The embodiment then modifies a DAI behavior for the secondary device in response to the modifying the ACR behavior for the secondary device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automatically preserving channel lock and performing dynamic ad insertion (DAI) in a multi-device setup.

Figure 1:
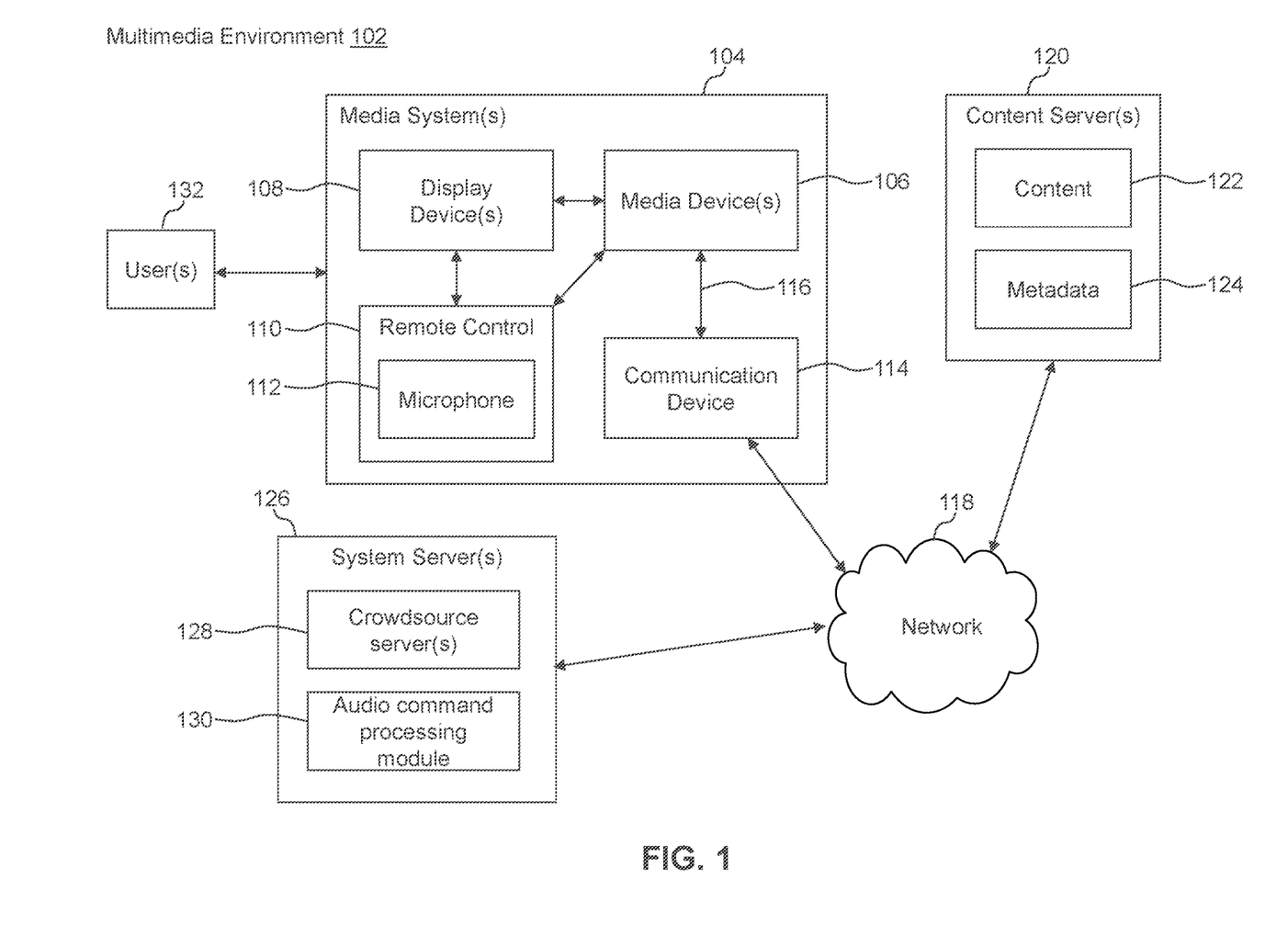
FIG. 1 illustrates a block diagram of a multimedia environment, according to some embodiments.

Various embodiments of this disclosure may be implemented using and/or may be part of a multimedia environment 102 shown in FIG. 1, in some embodiments. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content sources 120 (also called content providers, channels or sources 120). Although only one content server 120 is shown in FIG. 1, in practice the multimedia environment 102 may include any number of content sources 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126. It is also noted that the structural and functional aspects of the system servers 126 may wholly or partially exist in the same or different ones of the content sources 120.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
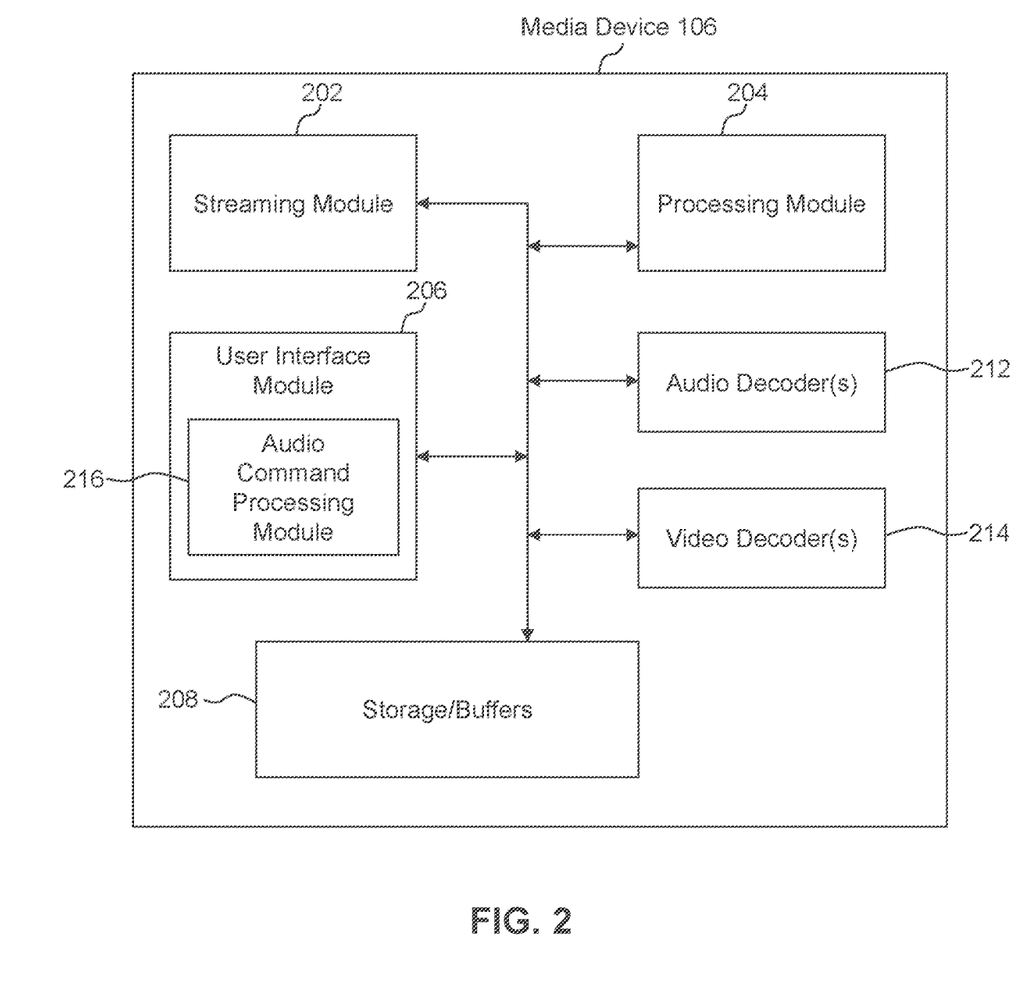
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Preserving Channel Lock and Performing DAI in a Multi-Device Setup

Referring to FIG. 1, a user 132 may consume (e.g., watch, listen, etc.) to multimedia content using an automated content recognition (ACR) enabled media device (e.g., a media device 106) and an ACR enabled output device (e.g., a display device 108). For example, the user 132 may watch a linear TV channel using an ACR enabled media device 106 and an ACR enabled display device 108. A person of ordinary skill in the art would understand that the user 132 may consume other types of multimedia content using the ACR enabled media device 106 and the ACR enabled display device 108.

In such a multi-device setup, the media device 106 may operate as a primary device and be tuned to a linear TV channel. The display device 108 may operate as a secondary device and receive the output from the media device 106 (e.g., over a High-Definition Multimedia Interface (HDMI) cable) and display it on its screen.

It is also often the case that both the media device 106 and the display device 108 may be configured to perform dynamic ad insertion (DAI) into the linear TV channel. To perform DAI, the media device 106 (or display device 108) may rely on an ACR server to perform ACR on the linear TV channel. For example, a system server 126 may perform ACR on the linear TV channel, thereby identifying various characteristics in the linear TV channel. A person of ordinary skill in the art would understand that the media device 106 (or display device 108) may rely on another server or device to perform the ACR on the linear TV channel.

The system server 126 may perform ACR on the linear TV channel, thereby identifying features that uniquely identify the linear TV channel. The system server 126 may also perform ACR on the linear TV channel, thereby identifying one or more potential content spots (e.g., advertisement spots) in the linear TV channel for possible replacement with new content using DAI.

The system server 126 may represent a characteristic in the linear TV channel as a fingerprint. For example, the system server 126 may represent a feature that uniquely identifies the linear TV channel as a fingerprint. The system server 126 may also represent a potential content spot in the linear TV channel (e.g., an advertisement) as a fingerprint.

The system server 126 may generate a fingerprint as a result of performing ACR on the linear TV channel. The fingerprint may uniquely identify a particular portion of content in the linear TV channel. The fingerprint may also uniquely identify a time point where the particular portion of content occurs in the linear TV channel. The fingerprint may also include additional metadata as would be appreciated by a person of ordinary skill in the art. For example, the fingerprint may include an indication of whether the fingerprint represents new content (e.g., a new advertisement) that replaced original content (e.g., an original advertisement) in the linear TV channel.

After performing ACR on the linear TV channel, the system server 126 may transmit the identified characteristics to the media device 106 (or display device 108). The system server 126 may transmit the identified characteristics to the media device 106 (or display device 108) using various mechanisms. For example, the system server 126 may transmit fingerprints representing features that uniquely identify the linear TV channel. The system server 126 may also transmit fingerprints representing potential content spots for replacement to the media device 106 (or display device 108).

The media device 106 (or display device 108) may use DAI to replace the identified one or more potential content spots in the linear TV channel with new content. For example, the media device 106 (or display device 108) may generate a fingerprint for content in the linear TV channel. The media device 106 (or display device 108) may then compare the generated fingerprint to a received fingerprint from the system server 126. If there is match, the media device 106 (or display device 108) may perform a DAI for the content identified by the received fingerprint. For example, the media device 106 (or display device 108) may transmit a request to a DAI server (e.g., the system server 126) for content to replace the content identified by the received fingerprint in the linear TV channel. In response, the media device 106 (or display device 108) may receive the replacement content and insert the replacement content in place of the content identified by the received fingerprint.

In order to effectively to perform DAI, the media device 106 (or display device 108) often needs to know what channel it is tuned to. For example, the media device 106 (or display device 108) often needs to ensure it is tuned to the same channel that the system server 126 is performing ACR on. In other words, the media device 106 (or display device 108) often needs to ensure that the fingerprints it receives from the system server 126 correspond to the channel it is tuned to. This may be referred to as channel lock. When the media device 106 (or display device 108) receives fingerprints from the system server 126 that do not match the linear TV channel it is tuned to, the media device 106 (or display device 108) likely has lost channel lock.

However, in a multi-device setup in which the media device 106 may be tuned to the linear TV channel and the display device 108 may receive the output from the media device 106 (e.g., over a HDMI cable) and display it on its screen, various technological problems can result, including a loss of channel lock. First, the display device 108 may lose channel lock when the media device 106 performs a DAI on the channel. This is because the display device 108 is expecting to encounter the original content in the channel rather than the replacement content inserted into the channel as a result of the media device 106 performing DAI. In other words, the display device 108 may receive fingerprints from the system server 126 that do not match the outputted channel from the media device 106.

Second, the display device 108 is often unable to intelligently perform a DAI on the channel because it may be attempting to replace the same underlying content as the media device 106. In other words, the display device 108 may be unable to intelligently perform a DAI on the channel because it may be replacing the replacement content inserted into the channel by the media device 106 rather than the original content in the channel (e.g., an original advertisement in the channel).

To solve the above technological problems, embodiments herein involve modifying the ACR and DAI behavior for a secondary device in a multi-device setup. First, an embodiment herein involves identifying which device in the multi-device setup is a primary device and which is a secondary device. Second, the embodiment involves modifying an ACR behavior for the secondary device to prevent the secondary device from losing channel lock. Finally, the embodiment involves modifying a DAI behavior on the secondary device so that the secondary device intelligently performs DAI in view of the DAI performed by the primary device.

To preserve channel lock and intelligently perform DAI in a multi-device setup, a system server 126 may identify which device in the multi-device setup is a primary device and which is a secondary device. The primary device may be the device that first receives the multimedia content (e.g., a linear TV channel). The secondary device may be the device that receives the output from the primary device and outputs it (e.g., displays it to a screen). For example, the primary device may be a media device 106 that is tuned to a linear TV channel, and the secondary device may a display device 108 that receives the output from the media device 106 (e.g., over a HDMI cable) and displays it on its screen. While the process of identifying which device in the multi-device setup is a primary device and which is a secondary device is described as being performed by a system server 126, this identification process may also be performed by the primary device, the secondary device, or some other device or server as would be appreciated by a person of ordinary skill in the art.

The system server 126 may identify which device in the multi-device setup is a primary device and which is a secondary device using various techniques. The system server 126 may identify which device in the multi-device setup is a primary device and which is a secondary device by identifying a set of devices that belong to the same household, business, or organization. For example, the system server 126 may identify a set of devices that belong to same household, business, or organization as those devices that are behind the same network address. For example, the system server 126 may identify a set of devices that belong to same household, business, or organization as those devices that share an Internet Protocol (IP) address. The system server 126 may then filter the identified set of devices using various techniques as would be appreciated by a person of ordinary skill in the art.

The system server 126 may filter the identified set of devices by selecting pairs of devices which are found to be outputting the same channel a threshold amount of time (e.g., 90% or more). For example, the system server 126 may filter the identified set of devices by selecting pairs of devices which are found using ACR data to be outputting the same channel a threshold amount of time.

The system server 126 may also filter the identified set of devices by selecting pairs of devices where one device loses channel lock at the same time that the other device in the pair performs a content replacement, at least for some threshold amount of time (e.g., 90% or more).

The system server 126 may also filter the selected pairs of devices found to be outputting the same channel a threshold amount of time by further selecting pairs of devices where one device loses channel lock at the same time that the other device in the pair performs a content replacement, at least for some threshold amount of time (e.g., 90% or more).

For each pair of devices in the final filtered list, the system server 126 may designate one device in the pair as the secondary device by the selecting the device which loses channel lock (also referred to as ACR match) when the other device performs a DAI. The system server 126 may designate the other device (which performs the DAI) as the primary device.

After identifying the primary device and the secondary device, the system server 126 may modify an ACR behavior for the secondary device, thereby preventing the secondary device from losing channel lock on the channel. By way of example and not limitation, the primary device may be identified as a media device 106 and the secondary device may be identified as a display device 108. The system server 126 may then modify an ACR behavior for the display device 108.

For example, when a DAI server (e.g., the system server 126) or the primary device itself (e.g., the media device 106) determines that the primary device will perform a DAI, the system server 126 can modify an ACR behavior for the display device 108 to prevent the display device 108 from losing channel lock. As discussed above, the display device 108 can lose channel lock because the display device 108 is expecting to encounter the original content in the channel rather than the replacement content inserted into the channel as a result of the media device 106 performing DAI. In other words, the display device 108 may determine that the fingerprints received from the system server 126 do not correspond to the channel it is tuned to. To solve this technological problem, the ACR behavior for the display device 108 can be modified such that the display device 108 expects to receive the replacement content inserted into the channel by the media device 106 rather than the original content in the channel. This can be accomplished in various ways.

The system server 126 can determine that the primary device (e.g., the media device 106) is going to perform a DAI to replace a portion of multimedia content in the channel with a replacement portion of multimedia content. For example, the system server 126 can receive a notification from the media device 106 that it is going to perform a DAI to replace a portion of multimedia content in the channel with a replacement portion of multimedia content. The system server 126 can also receive a notification from a DAI server (e.g., the system server 126 itself) that the media device 106 is going to perform a DAI to replace a portion of multimedia content in the channel with a replacement portion of multimedia content. The notification may indicate that the media device 106 will be replacing a portion of multimedia content in the channel at a particular time point with a replacement content. In other words, the notification may indicate the time point for replacement and the replacement content itself.

In response to determining that the primary device (e.g., the media device 106) is going to perform a DAI to replace a portion of multimedia content in the channel with replacement content, the ACR server (e.g., the system server 126) may change the ACR behavior of the secondary device (e.g., the display device 108) by changing the expected fingerprints transmitted to the secondary device (e.g., the display device 108). The ACR server may transmit a fingerprint representing the replacement content to the secondary device in place of a fingerprint representing the original content sought to be replaced. For example, the ACR server may change the fingerprint representing an underlying advertisement in the linear TV channel to the fingerprint representing a replacement advertisement inserted into the linear TV channel by the primary device. As a result, when the primary device performs a DAI, the secondary device may continue to be able match against expected fingerprints in the linear TV channel and therefore not lose channel lock.

The ACR server (e.g., the system server 126) may transmit the fingerprint representing the replacement content to the secondary device (e.g., the display device 108) with additional metadata. For example, the fingerprint may indicate that it represents replacement content inserted by the primary device (e.g., the media device 106). The ACR server (e.g., the system server 126) may also change the ACR behavior of the secondary device (e.g., the display device 108) by transmitting a message to the secondary device that alerts the secondary device that replacement content having a particular fingerprint is coming up at a future time point. In other words, the ACR server may transmit a message to the secondary device that alerts the secondary device that it will encounter a different fingerprint at the future time point in the channel than it expects. As a result, the secondary device may continue to be able to maintain channel lock.

After modifying an ACR behavior for the secondary device (e.g., the display device 108), a DAI behavior for the secondary device may also be modified, thereby allowing the secondary device to intelligently perform DAI. As discussed above, in existing approaches, when the secondary device receives the channel outputted from the primary device (e.g., the media device 106), the secondary device may end up replacing the content inserted into the channel by the primary device using DAI rather than the original content in the channel (e.g., an original advertisement in the channel). For example, the secondary device may replace a replacement advertisement inserted by the primary device using DAI. In other words, the secondary device may unnecessarily repeat the DAI process.

To solve this technological problem, the DAI behavior for the secondary device (e.g., the display device 108) may need to be modified such that the secondary device intelligently replaces content in the channel using DAI. For example, the secondary device may intelligently replace only the original advertisements in the channel rather than any of the replacement advertisements inserted into the channel by the primary device (e.g., the media device 106) using DAI. This can be accomplished in various ways.

For example, the DAI server (e.g., system server 126) can modify a DAI behavior on the secondary device (e.g., the display device 108) so that the secondary device can intelligently perform DAI. The DAI server can determine whether to perform a DAI on the secondary device based on the primary device (e.g., the media device 106) having already replaced a portion of multimedia content in the channel with replacement content. The DAI server may track whether the primary device has already replaced a portion of multimedia content in the channel with replacement content.

For example, the DAI server (e.g., system server 126) may receive a DAI request from the secondary device (e.g., the display device 108) to perform a DAI for a fingerprint representing particular content in the channel that occurs at a particular time point. In response, the DAI server can determine whether the primary device (e.g., the media device 106) already replaced a portion of content in the channel with the particular content identified by the fingerprint at the particular time point. If so, the DAI server may cause the secondary device not to perform an additional DAI at the particular time point. This can ensure that the secondary device does not unnecessarily repeat the DAI process.

The secondary device (e.g., the display device 108) can also modify its DAI behavior based on fingerprint data received from the ACR server (e.g., the system server 126). For example, the secondary device may receive a fingerprint representing replacement content inserted into the channel by the primary device (e.g., the media device 106). In addition to uniquely identifying the replacement content itself, the fingerprint may also indicate that the replacement content represents content added by the primary device. Based on this information, the secondary device may modify its DAI behavior. For example, when the secondary device encounters a fingerprint representing replacement content inserted into the channel, the secondary device may skip performing a DAI. In other words, the secondary device may skip transmitting a request to the DAI server (e.g., the system server 126) for content to replace the content inserted into the channel by the primary device. Alternatively, when the secondary device encounters a fingerprint representing original content in the channel (e.g., content not added by the primary device), the secondary device may perform a DAI. In other words, the secondary device may transmit a request to the DAI server for content to replace the original content represented by the fingerprint.

Figure 3:
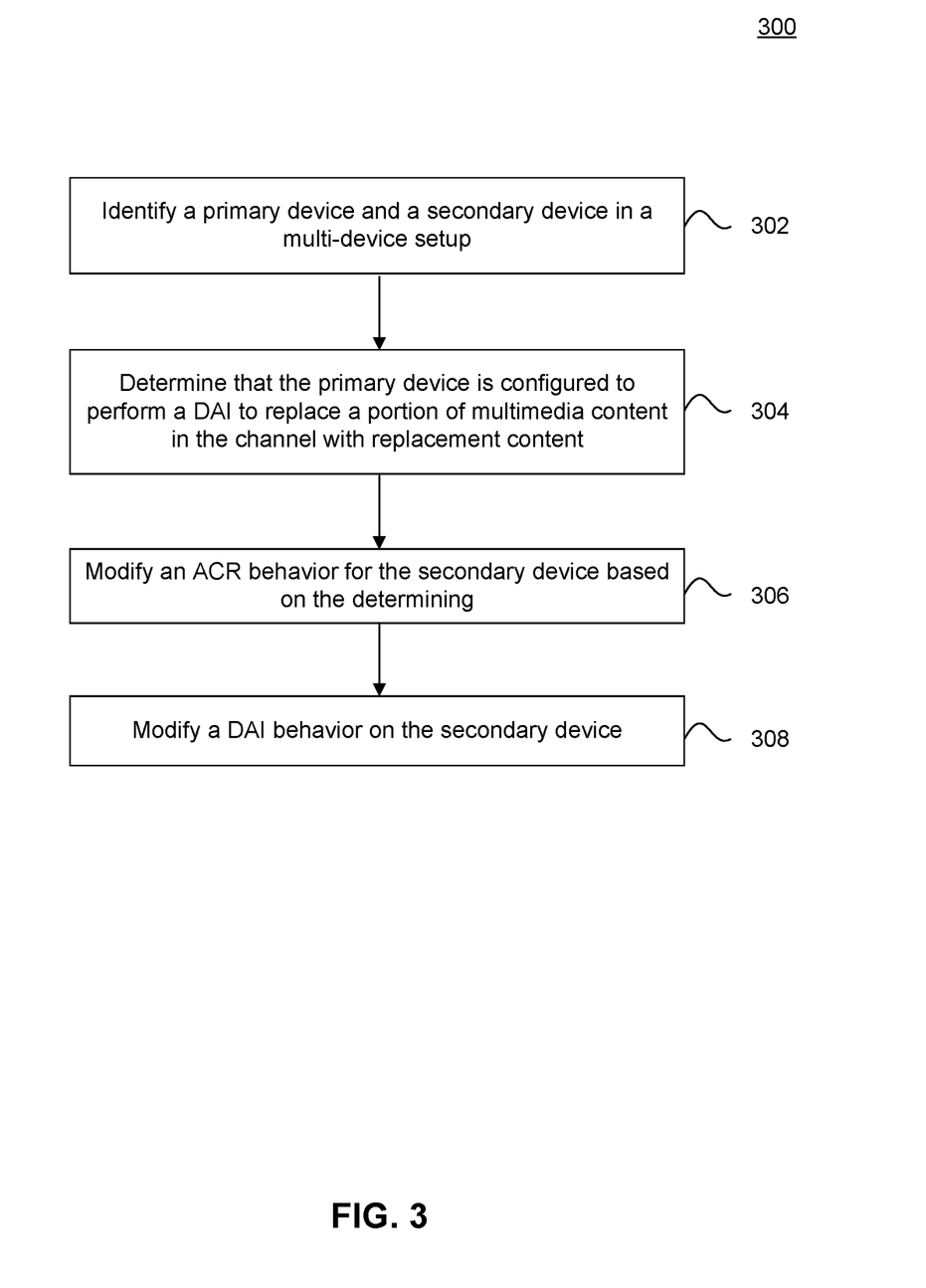
FIG. 3 is a flowchart illustrating a process for preserving channel lock and performing dynamic ad insertion (DAI) in a multi-device setup, according to some embodiments.

FIG. 3 illustrates a method 300 for preserving channel lock and performing DAI in a multi-device setup, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

For illustrative and non-limiting purposes, method 300 shall be described with reference to FIGS. 1 and 2. However, method 300 is not limited to those examples.

In 302, system server 126 identifies a primary device (e.g., a media device 106) and a secondary device (e.g., a display device 108) in a multi-device setup. For example, system server 126 can identify a secondary device that loses a channel lock on a channel based on a primary device performing DAI on the channel.

System server 126 may identify which device in the multi-device setup is a primary device and which is a secondary device by identifying a set of devices that belong to the same household, business, or organization. For example, system server 126 may identify a set of devices that belong to same household, business, or organization as those devices that are behind the same network address. System server 126 may identify a set of devices that belong to same household, business, or organization as those devices that share an IP address.

System server 126 may filter the identified set of devices by selecting pairs of devices which are found to be outputting the same channel a threshold amount of time (e.g., 90% or more). For example, system server 126 may filter the identified set of devices by selecting pairs of devices which are found using ACR data to be outputting the same channel a threshold amount of time.

System server 126 may further filter the selected pairs of devices found to be outputting the same channel a threshold amount of time by further selecting pairs of devices where one device loses channel lock at the same time that the other device in the pair performs a content replacement, at least for some threshold amount of time (e.g., 90% or more).

For each pair of devices in the final filtered list, system server 126 may designate one device as the secondary device by the selecting the device which loses channel lock (also referred to as ACR match) when the other device performs a DAI. The system server 126 may designate the other device (which performs DAI) as the primary device.

In 304, system server 126 determines that the primary device (e.g., the media device 106) is configured to perform a DAI to replace a portion of multimedia content in the channel with a replacement content. For example, system server 126 can receive a notification from the primary device that it is going to perform a DAI to replace a portion of multimedia content in the channel with replacement content.

System server 126 can also receive the notification from a DAI server (e.g., the system server 126 itself) that the primary device is going to perform a DAI to replace a portion of multimedia content in the channel with replacement content. The notification may indicate that the primary device will be replacing the portion of multimedia content in the channel at the particular time point with the replacement content. In other words, the notification may indicate the time point for replacement and the replacement content itself.

In 306, system server 126 modifies an ACR behavior for the secondary device (e.g., the display device 108) based on the determining, thereby preventing the secondary device from losing channel lock on the channel. System server 126 may change the ACR behavior for the secondary device by changing the expected fingerprints transmitted to the secondary device. System server 126 may transmit a fingerprint representing the replacement content to the secondary device in place of a fingerprint representing the original content sought to be replaced. For example, system server 126 may change the fingerprint representing an underlying advertisement in the linear TV channel to the fingerprint representing a replacement advertisement inserted into the linear TV channel by the primary device (e.g., the media device 106).

System server 126 may also change the ACR behavior of the secondary device by transmitting a message to the secondary device that alerts the secondary device that replacement content having a particular fingerprint is coming up at a future time point. In other words, system server 126 may transmit a message to the secondary device that alerts the secondary device that it will encounter a different fingerprint at the future time point in the channel than it expects.

In 308, system server 126 modifies a DAI behavior for the secondary device (e.g., the display device 108). System server 126 may modify a DAI behavior for the secondary device based on the modifying the ACR behavior for the secondary device. To modify a DAI behavior on the secondary device, system server 126 may receive a DAI request from the secondary device to perform a DAI for a fingerprint representing particular content in the channel that occurs at a particular time point. In response, system server 126 can determine whether the primary device (e.g., the media device 106) already replaced a portion of multimedia content in the channel with the particular content identified by the fingerprint at the particular time point. If so, system server 126 may cause the secondary device not to perform an additional DAI at the particular time point. This can ensure that the secondary device does not unnecessarily repeat the DAI process.

System server 126 can also modify a DAI behavior for the secondary device by transmitting fingerprint data to the secondary device. For example, system server 126 may transmit to the secondary device a fingerprint representing replacement content inserted into the channel by the primary device. In addition to uniquely identifying the replacement content itself, the fingerprint may also indicate that the replacement content was content added by the primary device. Based on this information, the secondary device may modify its DAI behavior. For example, when the secondary device encounters the fingerprint representing the replacement content inserted into the channel, the secondary device may skip performing a DAI. In other words, the secondary device may skip transmitting a request to the DAI server (e.g., the system server 126) for content to replace the replacement content inserted by into the channel by the primary device. Alternatively, when the secondary device encounters a fingerprint representing original content in the channel (e.g., content that was not added by the primary device), the secondary device may perform a DAI. In other words, the secondary device may transmit a request to the DAI server for content to replace the original content represented by the fingerprint.

Example Computer System

Figure 4:
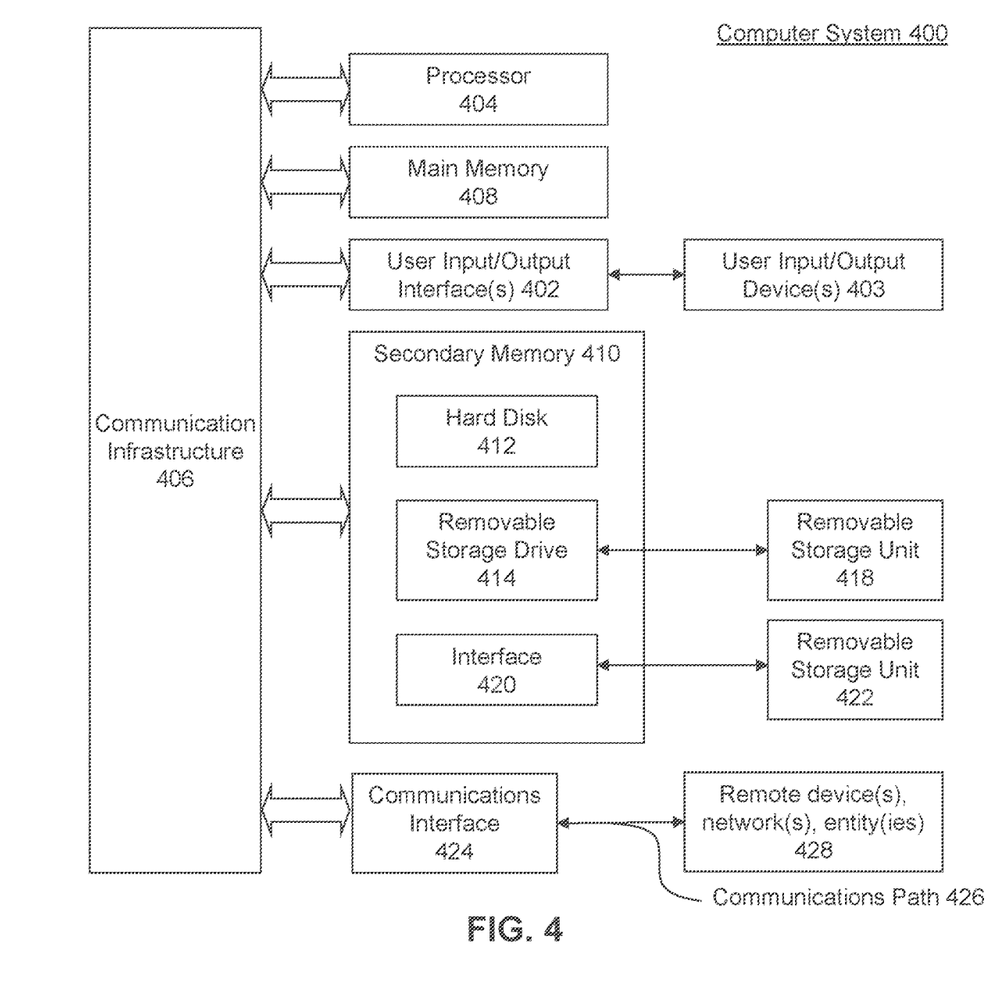
FIG. 4 illustrates an example computer system useful for implementing various embodiments.

Various embodiments may be implemented, for example, using one or more well-known computer systems, such as computer system 400 shown in FIG. 4. For example, the media device 106 may be implemented using combinations or sub-combinations of computer system 400. Also or alternatively, one or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400 or processor(s) 404), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for preserving channel lock and performing dynamic ad insertion (DAI) in a multi-device setup, comprising:

identifying a primary automated content recognition (ACR) output device that performs the DAI on a channel, and a secondary ACR output device that receives the channel from the primary ACR output device and is prevented from performing the DAI on the channel based on the primary ACR output device performing the DAI on the channel;

in response to the identification, determining that the primary ACR output device is configured to perform the DAI to replace an original portion of multimedia content in the channel with a replacement portion of the multimedia content; and in response to the determination, transmitting a fingerprint representing the replacement portion of the multimedia content in the channel to the secondary ACR output device in place of a fingerprint representing the original portion of the multimedia content in the channel, thereby enabling the secondary ACR output device to perform the DAI on the channel.

2. The computer-implemented method of claim 1, wherein the identifying the primary ACR output device and the secondary ACR output device comprises:

identifying the secondary ACR output device based on the primary ACR output device and the secondary ACR output device sharing a network address.

3. The computer-implemented method of claim 2, wherein the identifying the primary ACR output device and the secondary ACR output device comprises:

identifying the secondary ACR output device based on the primary ACR output device and the secondary ACR output device outputting the channel a first threshold amount of time.

4. The computer-implemented method of claim 3, wherein the identifying the primary ACR output device and the secondary ACR output device comprises:

identifying that the secondary ACR output device, a second threshold amount of time, fails to perform the DAI on the channel at a same time that the primary ACR output device performs the DAI on the channel.

5. The computer-implemented method of claim 1, further comprising:

transmitting an alert to the secondary ACR output device, wherein the alert indicates that the fingerprint representing the replacement portion of the multimedia content will occur at a future time point in the channel.

6. The computer-implemented method of claim 1, further comprising:

modifying a DAI behavior for the secondary ACR output device based on the transmitting.

7. The computer-implemented method of claim 6, wherein the modifying the DAI behavior for the secondary ACR output device comprises:

determining whether to perform the DAI on the secondary ACR output device based on the primary ACR output device having replaced the original portion of the multimedia content in the channel with the replacement portion of the multimedia content.

8. A system, comprising:

one or more memories; and at least one processor each coupled to at least one of the memories and configured to perform operations comprising:

identifying a primary automated content recognition (ACR) output device that performs dynamic ad insertion (DAI) on a channel, and a secondary ACR output device that receives the channel from the primary ACR output device and is prevented from performing the DAI on the channel based on the primary ACR output device performing the DAI on the channel;

in response to the identification, determining that the primary ACR output device is configured to perform the DAI to replace an original portion of multimedia content in the channel with a replacement portion of the multimedia content; and in response to the determination, transmitting a fingerprint representing the replacement portion of the multimedia content in the channel to the secondary ACR output device in place of a fingerprint representing the original portion of the multimedia content in the channel, thereby enabling the secondary ACR output device to perform the DAI on the channel.

9. The system of claim 8, wherein the identifying the primary ACR output device and the secondary ACR output device comprises:
identifying the secondary ACR output device based on the primary ACR output device and the secondary ACR output device sharing a network address.

10. The system of claim 9, wherein the identifying the primary ACR output device and the secondary ACR output device comprises:
identifying the secondary ACR output device based on the primary ACR output device and the secondary ACR output device outputting the channel a first threshold amount of time.

11. The system server of claim 10, wherein the identifying the primary ACR output device and the secondary ACR output device comprises:
identifying that the secondary ACR output device, a second threshold amount of time, fails to perform the DAI on the channel at a same time that the primary ACR output device performs the DAI on the channel.

12. The system of claim 8, wherein the operations further comprise:
transmitting an alert to the secondary ACR output device, wherein the alert indicates that the fingerprint representing the replacement portion of the multimedia content will occur at a future time point in the channel.

13. The system of claim 8, wherein the operations further comprise:
modifying a DAI behavior for the secondary ACR output device based on the transmitting.

14. The system of claim 13, wherein the modifying the DAI behavior for the secondary ACR output device comprises:
determining whether to perform the DAI on the secondary ACR output device based on the primary ACR output device having replaced the original portion of the multimedia content in the channel with the replacement portion of the multimedia content.

15. A non-transitory computer-readable medium having instructions stored thereon that, when executed by at least one computing device, cause the at least one computing device to perform operations comprising:
identifying a primary automated content recognition (ACR) output device that performs dynamic ad insertion (DAI) on a channel, and a secondary ACR output device that receives the channel from the primary ACR output device and is prevented from performing the DAI on the channel based on the primary ACR output device performing the DAI on the channel;

in response to the identification, determining that the primary ACR output device is configured to perform the DAI to replace an original portion of multimedia content in the channel with a replacement portion of the multimedia content; and in response to the determination, transmitting a fingerprint representing the replacement portion of the multimedia content in the channel to the secondary ACR output device in place of a fingerprint representing the original portion of the multimedia content in the channel, thereby enabling the secondary ACR output device to perform the DAI on the channel.

16. The non-transitory computer-readable medium of claim 15, wherein the identifying the primary ACR output device and the secondary ACR output device comprises:
identifying the secondary ACR output device based on the primary ACR output device and the secondary ACR output device sharing a network address.

17. The non-transitory computer-readable medium of claim 16, wherein the identifying the primary ACR output device and the secondary ACR output device comprises:
identifying the secondary ACR output device based on the primary ACR output device and the secondary ACR output device outputting the channel a first threshold amount of time.

18. The non-transitory computer-readable medium of claim 17, wherein the identifying the primary ACR output device and the secondary ACR output device comprises:
identifying that the secondary ACR output device, a second threshold amount of time, fails to perform the DAI on the channel at a same time that the primary ACR output device performs the DAI on the channel.

19. The non-transitory computer-readable medium of claim 15, wherein the operations further comprise:
modifying a DAI behavior for the secondary ACR output device based on the transmitting.

20. The non-transitory computer-readable medium of claim 19, wherein the modifying the DAI behavior for the secondary ACR output device further comprises:
determining whether to perform the DAI on the secondary ACR output device based on the primary ACR output device having replaced the original portion of the multimedia content in the channel with the replacement portion of the multimedia content.

* * * * *

UNITED STATES PATENT AND TRADEMARK OFFICE
CERTIFICATE OF CORRECTION

PATENT NO. : 12,160,632 B2
APPLICATION NO. : 18/486321
DATED : December 3, 2024
INVENTOR(S) : Grover Page 1 of 2

It is certified that error appears in the above-identified patent and that said Letters Patent is hereby corrected as shown below:

On the Title Page

Column 2, Item (57), under "Abstract", Line 9, delete "that that" and insert -- that --, therefor.

In the Specification

In Column 1, Line 9, delete "2022," and insert -- 2022, now U.S. Pat. No. 11,838,581, --, therefor.

In Column 2, Line 33, delete "operates" and insert -- operates by --, therefor.

In Column 2, Line 36, delete "that that" and insert -- that --, therefor.

In Column 5, Line 35, delete "OGG" and insert -- OGG, --, therefor.

In Column 5, Line 48, delete "DV, DVCPRO," and insert -- DV, --, therefor.

In Column 8, Line 13, delete "may" and insert -- may be --, therefor.

In Column 9, Line 59, delete "able" and insert -- able to --, therefor.

In Column 9, Lines 66-67, delete "The ACR server (e.g., the system server 126) may also change the ACR" and insert the same at Column 10, Line 1, before "behavior", as a continuation paragraph.

In Column 13, Line 2, delete "by into" and insert -- into --, therefor.

In Column 13, Line 55, delete "and/any" and insert -- and/or any --, therefor.

Signed and Sealed this
Sixteenth Day of December, 2025

John A. Squires
*Director of the United States Patent and Trademark Office*

CERTIFICATE OF CORRECTION (continued)
U.S. Pat. No. 12,160,632 B2

In the Claims

In Column 17, Claim 11, Line 28, delete "system server" and insert -- system --, therefor.